United States Patent [19]

Okumura et al.

[11] Patent Number: 4,821,316
[45] Date of Patent: Apr. 11, 1989

[54] KEY TELEPHONE SYSTEM

[75] Inventors: Senji Okumura, Chiba; Yasuo Kobayashi, Saitama; Ryuzo Sugiura, Tokyo; Masatoshi Ikeda, Kanagawa, all of Japan

[73] Assignee: Tamura Electric Works, Ltd., Tokyo, Japan

[21] Appl. No.: 104,763

[22] Filed: Oct. 2, 1987

[30] Foreign Application Priority Data

Oct. 3, 1986 [JP] Japan .................. 61-235880

[51] Int. Cl.$^4$ .................. H04M 1/00; H04Q 5/20
[52] U.S. Cl. .................. 379/156; 379/165; 379/201
[58] Field of Search .............. 379/156, 157, 158, 159, 379/160, 164, 165, 201

[56] References Cited

U.S. PATENT DOCUMENTS

| 4,491,693 | 1/1985 | Sano et al. | 379/156 |
| 4,559,417 | 12/1985 | Komuro et al. | 379/157 |
| 4,595,800 | 6/1986 | Nagatomi et al. | 379/165 |

OTHER PUBLICATIONS

Japanese Patent Laid-Open No. Sho 60-7294 Int. Cl. H04Q 3/58, H04M 1/72 (in Japanese).

Primary Examiner—Keith E. George
Assistant Examiner—Wing Fu Chan
Attorney, Agent, or Firm—Blakely, Sokoloff, Taylor & Zafman

[57] ABSTRACT

A key telephone system includes a temporary registration memory for temporarily storing operating data and a final registration timing data memory for storing final registration timing data, including a timing condition for transferring contents of the temporary registration memory to the operating data memory. Operating data input by a user and the final registration timing data are written into the temporary registration memory and the final registration timing data memory, respectively, from a data input unit connected to the main unit during a data setting mode. The system discriminates establishment of the timing condition designated in accordance with the final registration timing data stored in the final registration timing data memory, whereupon the operating data stored in the temporary registration memory is transferred to the operating data memory.

18 Claims, 8 Drawing Sheets

KEY TELEPHONE SYSTEM

BACKGROUND OF THE INVENTION

The present invention relates to a key telephone system and, more particularly, to a system of setting operating data for determining a basic operation of the key telephone system.

An example of a conventional operating data setting system of this type is disclosed in Japanese Patent Laid-Open (Kokai) No. 60-7294. In this system, when a operating data memory is to be rewritten, an input which refers to the operating data a plurality of times is analyzed and detected to as not to adversely affect a generating call. If such an input is detected, all the operating data relating to the current input in the operating data memory is transferred to a working memory, and the working memory is referred until a series of operations based on the current input are completed. In this case, if an operating data registering (rewriting) operation is performed, the operating data is transferred from a buffer memory which stores data relating to registering operations to the operating data memory.

However, processing control of the above conventional system is complicated, and registration is uniformly performed regardless of importance or urgency of the operating data to be rewritten. Therefore, a priority order of generating calls cannot be selected in accordance with characteristics of the operating data or a capacity of the system, and a registration timing cannot be selected case by case in accordance with the capacity of the system and its operating state.

SUMMARY OF THE INVENTION

It is, therefore, a principal object of the present invention to provide a key telephone system capable of updating operating data by simple control processing in accordance with characteristics of the operating data to be rewritten, a capacity of the system, and its operation state.

According to an aspect of the present invention, there is provided a key telephone system including a main unit having a speech path switch for selectively connecting at least one office line with a plurality of key telephone sets, an operating data memory for storing operating data required for operating the system, operation mode setting means for setting an operation mode of the system to either a call processing mode or a data setting mode, control means for updating contents of the operating data memory in accordance with the operating data externally inputted during the data setting mode and for referring to the operating data memory to control the speech path switch during the call processing mode, comprising a temporary registration memory for temporarily storing the operating data, a final registration timing data memory for storing final registration timing data including a timing condition for transferring contents of the temporary registration memory to the operating data memory, writing means for writing the operating data input and the final registration timing data in the temporary registration memory and the final registration timing data memory, respectively, from a data input unit connected to the main unit during the data setting mode, discriminating means for discriminating establishment of the timing condition designated in accordance with the final registration timing data stored in the final registration timing data memory, and transferring means for transferring the operating data stored in the temporary registration memory to the operating data memory in accordance with a timing condition establishment output from the discriminating means.

DETAILED DESCRIPTION OF THE PREFERRED EMBODIMENTS

Preferred embodiments of the present invention will be described below with reference to the accompanying drawings.

Figure 1:
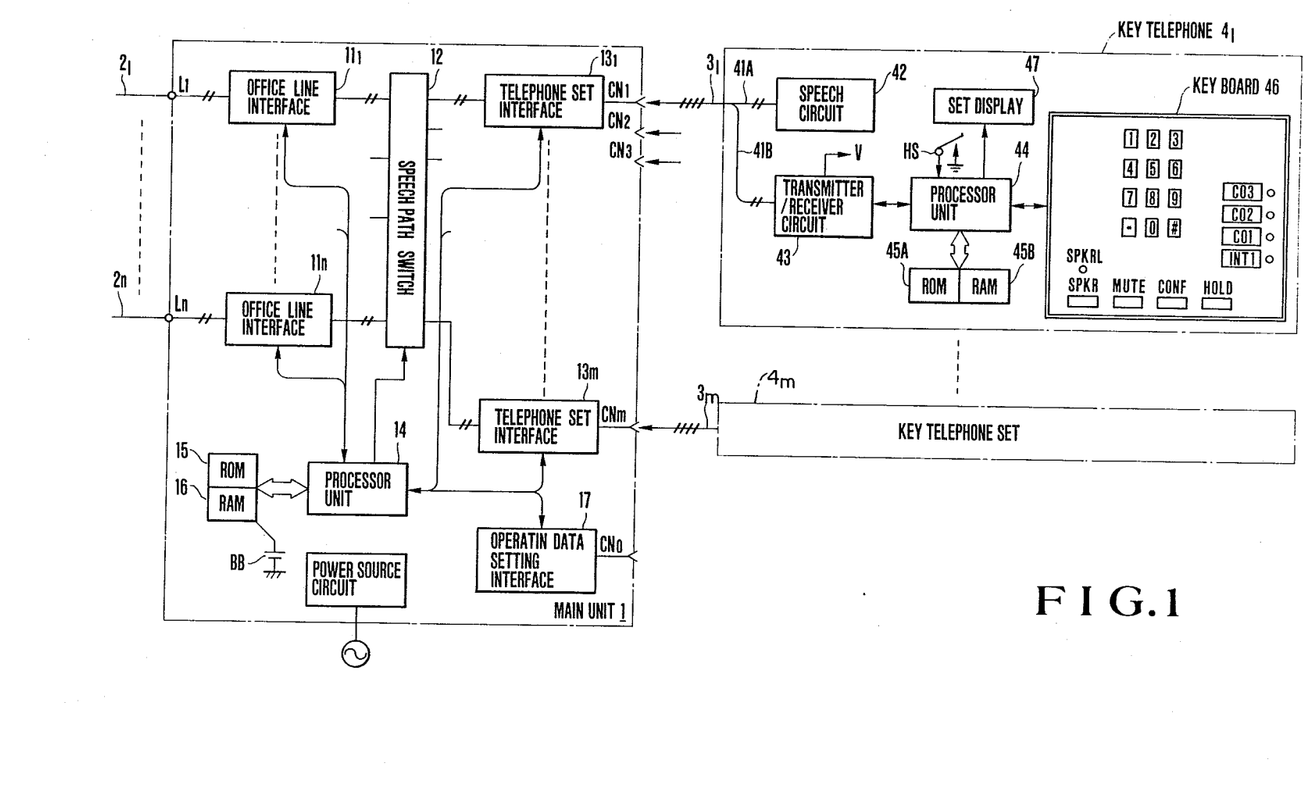
FIG. 1 is a block diagram of an embodiment of the present invention.

FIG. 1 is a block diagram of an embodiment of the present invention. In FIG. 1, reference numeral 1 denotes a main unit. The main unit 1 is connected to office lines 2 ($2_1$ to $2_n$) such as office lines from a telephone office or CO/PBX lines from private branch exchanges through office line terminals L ($L_1$ to $L_n$), and is also connected to key telephone sets (sets) 4 ($4_l$ to $4_m$) through connectors CN ($CN_1$ to $CN_m$) and lines 3 ($3_1$ to $3_m$) each consisting of a pair of speech lines and a pair of signal lines. The office lines $2_1$ to $2_n$ are connected to a speech path switch 12 respectively through office line interfaces 11 ($11_1$ to $11_n$). The speech path switch 12 and the lines $3_1$ to $3_m$ respectively from the sets $4_1$ to $4_m$ are connected with each other through telephone set interfaces 13 ($13_1$ to $13_m$) so that they are selectively connected by an analog switch or a crossing point such as a relay contact in the speech path switch 12.

Note that each of the office line interfaces $11_1$ to $11_n$ has an incoming detecting function, a DC loop forming function with respect to an office line, and a dialing function by holding and pulse signals or a multiple voice frequency (to be referred to as an MF hereinafter) signal, and the speech path switch 12 has a function of selectively connecting the office lines $2_1$ to $2_n$ with the sets $4_1$ to $4_m$ and selectively connecting the sets $4_1$ to $4_m$ with each other. The telephone set interfaces $13_1$ to $13_m$ supply speech power source voltages to the sets $4_1$ to $4_m$ through the speech lines, and transmit/receive data signals and supply control power source voltages through the signal lines.

The above operations are controlled in a processor unit 14 such as a well-known microprocessor and a control section consisting of a read-only memory (ROM) 15 and a random access memory (RAM) 16 such that the processor unit 14 executes a program in the ROM 15 while accessing predetermined data to the RAM 16. Note that the RAM 16 is backed up by a back-up battery BB when a power failure occurs, i.e., no power is supplied from the main power source.

In each of the sets $4_1$ to $4_m$, a speech circuit 42 is connected to speech lines 41A, and signal lines 41B are connected to processor unit 44 which is similar to the control circuit of the main unit 1 but is smaller in size and comprises a control section consisting of a ROM 45A and a RAM 45B through transmitter/receiver circuit 43. In accordance with a control signal supplied from the main unit 1 through the transmitter/receiver circuit 43, generation of an incoming signal tone, or ON/OFF or flickering of display lamps of a keyboard 46 are controlled, and in accordance with an operation of each switch of the keyboard 46 and an operation of a hook switch HS, operation data representing these states are transmitted to the main unit 1 through the transmitter/receiver circuit 43. The keyboard 46 has ten keys, a "*" key, and a "#" key, and also has a speaker key spkr used in combination with a lamp spkrl, a hold key HLD, and the like.

Note that the transmitter/receiver circuit 43 has a power source separating function, i.e., extracts a power supplied from the main power source of the main unit 1 through the signal lines 41B, stabilizes it, and supplies it as a local power source voltage V to each section which requires it.

In this embodiment, the set $4_1$ connected to the connector $CN_1$, i.e., at an installation position "1" is a key telephone set with a display. That is, the set $4_1$ has a display 47 and is utilized to set various data such as the operating data.

More specifically, the main unit 1 has an operating data setting interface 17, and disconnects the key telephone set with a display from the connector $CN_1$ and connects it to the connector $CN_0$. An operator views display on the display 47 and performs a predetermined key operation for data setting while the key telephone set is connected to the operating data setting interface 17 through the connector $CN_0$.

Figure 2:
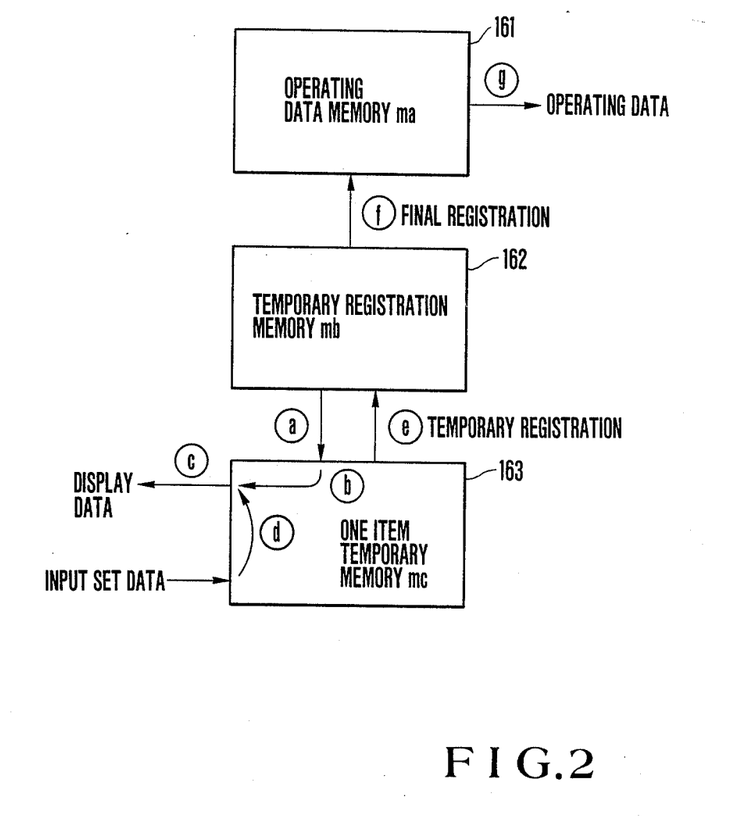
FIG. 2 is a schematic view of an arrangement of a RAM.

In this embodiment, the RAM 16 of the main unit 1 includes an operating data memory (ma) 161, a temporary registration memory (mb) 162, and a temporary memory or buffer memory (mc) 163 in relation to setting of working memory, as shown in FIG. 2. As will be described later, when operating data is to be set, input setting data is temporarily registered in the temporary registration memory mb through the temporary memory mc, and is finally registered in the operating data memory ma when final registration conditions are set in accordance with a preset final registration mode. Therefore, the temporary registration memory mb normally stores the same operating data as that stored in the operating data memory ma for referring to the operating data. The temporary memory mc stores the operating data of one item.

In this embodiment, the final registration modes include the following six modes, and either of these modes can be arbitrarily selectively set by a key input operation of the final registration mode data performed from the key telephone set with a display (e.g., $4_1$) connected through the connector $CN_0$.

①: Immediate Registration

When the final registration mode data is input, final registration is immediately performed.

②: System Idling Registration

After this mode is set, final registration is performed when it is determined that the system is in an idling state since no call is present.

③: System Pseudo Idling Registration

Even if calls are present, final registration is performed when it is determined in accordance with the characteristics, the number, and the like of the calls that an operation state of the system is substantially in an idling state (pseudo idling state). More specifically, in this embodiment, the pseudo idling state is determined when no office line call is present. However, the pseudo idling state may be arbitrarily set in accordance with a combination of the characteristics and number of calls.

④: Time Designating Registration

Final registration is performed when a designated time has reached.

⑤: Combination Registration of ② or ③ and ④ (No. 1)

Registration is performed when either of combinations of conditions ② or ③ and ④ is first established. More specifically, this registration mode includes ⑤a: a mode of a combination of ② and ④, ⑤b: a mode of a combination of ③ and ④, and ⑤c: a mode of a combination of ②, ③, and ④ in accordance with combinations of ② or ③ and ④. Although ⑤a is adopted in this embodiment, ⑤b or ⑤c may be adopted, or either of these modes may be selectively set by a predetermined operation.

When this mode ⑤ is set, the operating data is always rewritten when the designated time has reached even if the system is not set in the idling or pseudo idling state while the operating data is not rewritten unless the system is set in the idling or pseudo idling state in the mode ② or ③.

⑥: Combination Registration of ② or ③ and ④ (No. 2)

Final registration is performed when the condition ② or ③ is established after the condition ④ is established. Similar to the mode ⑤, this mode also includes ⑥a: a mode of a combination of ② and ④, ⑥b: a mode of a combination of ③ and ④, and ⑥c: a mode of a combination of ② and ③, and ④. Although ⑥a is adopted in this embodiment, ⑥b or ⑥c may be adopted, or either of these modes may be selectively set by a predetermined operation.

When the mode ④ is set, a time such as midnight or a holiday (in the case of an office) at which a generation frequency of a call is assumed to be extremely low is designated. In this case, even if telephone communication is performed, the operating data is rewritten when the designated time has reached not in consideration of the above situation at all, thereby interrupting the communication. On the contrary, when the mode ⑥ is set, interruption of communication at the designated time can be eliminated.

Operating data setting temporary registration and setting of the final registration mode data are performed as follows.

(A) Working Data Setting Temporary Registration (a) An off-hook operation is performed, and then "#", "*", "0", and "0" keys of dialing keys are sequentially depressed. Thereafter, when a predetermined function key (in this embodiment, the spkr (speaker) key) is depressed, the main unit is set in the temporary registration mode. That is, a confirmation tone is generated, and the spkr lamp spkrl consisting of a light-emitting diode on the keyboard 46 flickers.

(b) In this state, when the number designating a set item is input from the dialing keys, a confirmation tone is generated, and the spkr lamp spkrl is steadily kept on. In addition, the data corresponding to the designated item is transferred from the temporary registration memory mb to the temporary memory mc, and the designated item is displayed on the display 47 (a route ⓐ→ⓑ→ⓒ in FIG. 2).

(c) When desired data is inputted by a predetermined function key or the dialing keys in accordance with the set item, the input data is fetched in the temporary memory mc and is displayed on the display 47 (a route ⓓ→ⓒ).

(d) When a predetermined function key (in this embodiment, the hold key HLD) is depressed after the set data is input, the set data is transferred from the temporary memory mc to the temporary registration memory mb, and operating data corresponding to the designated item on the memory mb is rewritten (a route ⓔ).

(e) In order to set data of the next item, the above operation is repeated from (b). In order to stop registration, an on-hook operation is performed.

During temporary registration, calls are processed in accordance with old data stored in the operating data memory ma (a route ⓖ).

(B-1) Final Registration ① (Immediate Registration)

An off-hook operation is performed, "#", "*", "0", and "1" keys of the dialing keys are sequentially depressed, and then the key spkr is depressed. Therefore, a currently continuing call is forcibly set in the on-hook state if such a call is present, and the contents of the temporary registration memory mb are simultaneously transferred to the operating data memory and finally registered therein (a route ⓕ).

(B-2) Final registration ② (System Idling Registration)

An off-hook operation is performed, "#", "*", "0", and "2" keys of the dialing keys are sequentially depressed, and then the key spkr is depressed. Therefore, final registration is performed when a currently executed call disappears.

(B-3) Final Registration ③ (System Pseudo Idling Registration)

An off-hook operation is performed, "#", "*", "0", and "3" keys of the dialing keys are sequentially depressed, and then the key spkr is depressed. Therefore, final registration is performed when an office line call disappears.

(B-4) Final Registration ④ (Time Designating Registration)

An off-hook operation is performed, "#", "*", "0", and "4" keys of the dialing keys are sequentially depressed, keys XX (XX=0 to 23) are depressed to designate a timing, and then the key spkr is depressed. Therefore, if a currently continuing call is present at the time designated by XX, such a call is forcibly set in the on-hook state to perform final registration.

(B-5) Final Registration ⑤ (Combination Registration 1)

An off-hook operation is performed, "#", "*", "0", "5" keys are sequentially depressed, a timing is designated as in (B-1), and then the key spkr is depressed. Therefore, final registration is performed when a call disappears befodre the designated time has reached, or when the designated time has reached by ending a currently continuing call even if a call does not disappear.

(B-6) Final Registration ⑥ (Combination Registration 2)

An off-hook operation is performed, "#", "*", "0", and "6" keys are sequentially depressed, a timing is designated as in (B-4), and the key sprk is depressed. Therefore, final registration is performed when a call disappears after the designated time has reached.

Data of the types of final registration modes and designated times associated therewith are stored in a predetermined area (final registration mode memory) of the RAM 16.

An operation of the embodiment will be described in detail with reference to flow charts of FIGS. 3 to 6. Note that as for final registration, only the basic patterns ① to ④ will be described.

Figure 3:
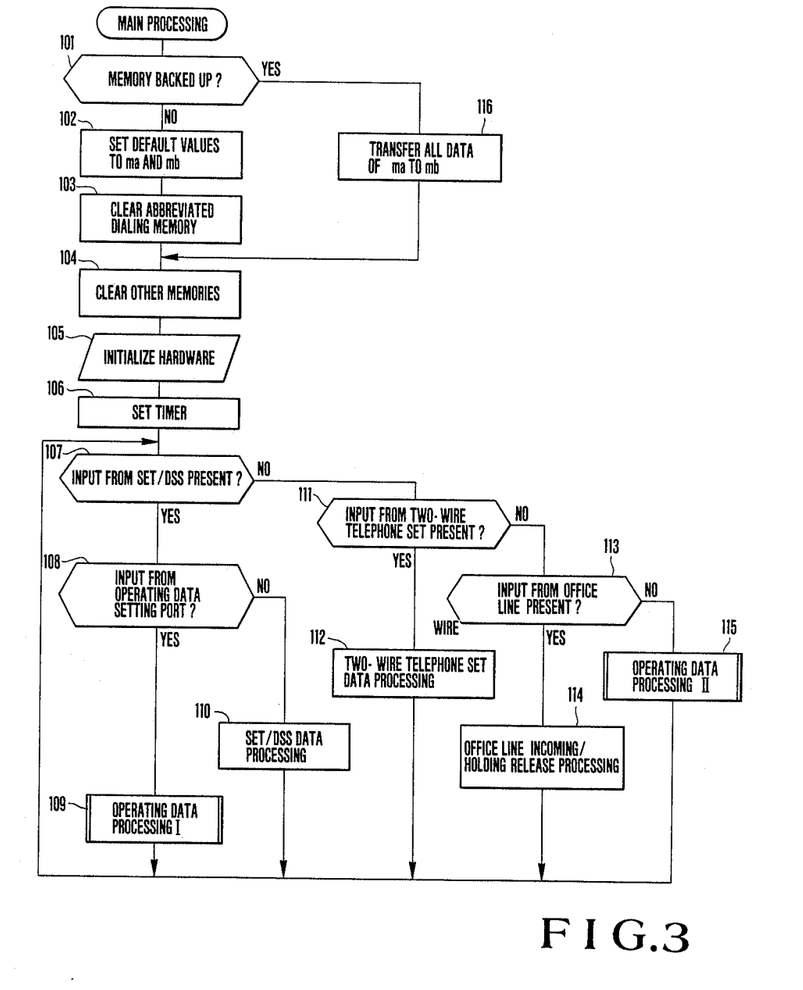
FIGS. 3 to 6 are flow charts for explaining control operations.

FIG. 3 shows a main processing program according to the processor unit 14 of the main unit 1. When the power switch is turned on to release the reset state, the processor unit 14 checks whether the RAM 16 is backed up (step 101). If the RAM 16 is not backed up, the processor unit 14 sets predetermined default values of the ROM 15 in the operating data memory ma in units of items, sets the same predetermined default values in the temporary registration memory mb (step 102), and clears an abbreviated dialing memory provided in a predetermined area of the RAM 16 (step 103). Then, the processor unit 14 clears other memories (step 104), sets each section in a state corresponding to the operating data set in the operating data memory ma (srtep 105), and then sets a timer for timer interruption (step 106). Thereafter, an interruption processing program as shown in FIG. 4 is executed every time the timer has reached a set time.

Figure 4:
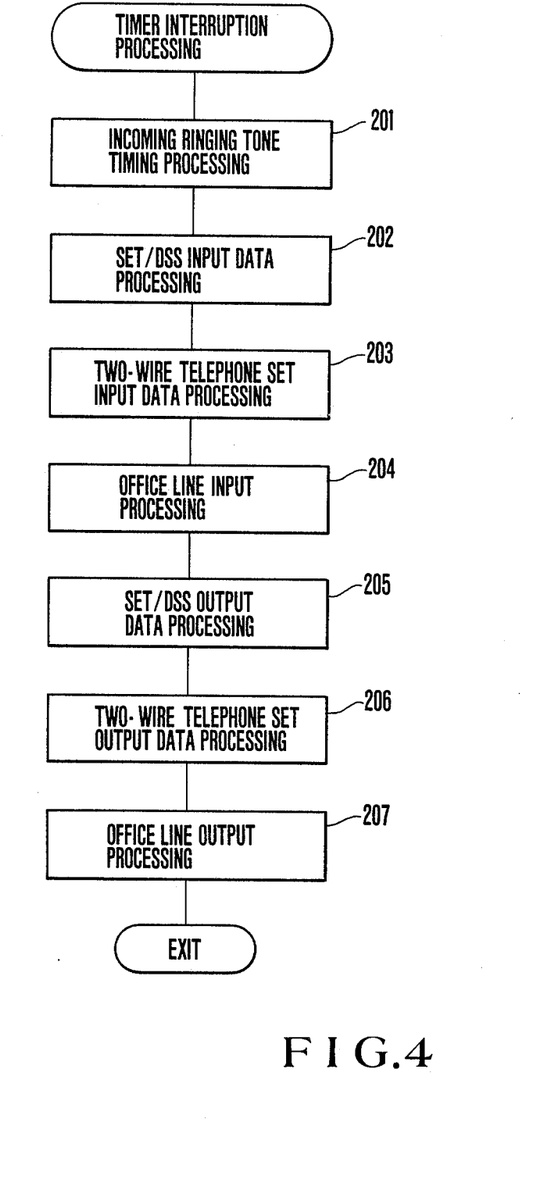

In FIG. 4, the processor unit 14 executes an incoming ringing tone timing processing (step 201). For example, when an oscillator for generating an incoming ringing tone is incorporated in the main unit 1, an output from the oscillator is supplied as an intermittent tone to a corresponding one of the sets. In this case, an office line call and an extension call can be distinguished from each other since intervals of the intermittent tones thereof are different. This step is a processing step for taking an intermittent timing. Note that when an oscillator is incorporated in a set, a control signal is supplied to generate an incoming ringing tone at a desired timing through the processor unit 44 of the set.

Then, the processor unit 14 checks the presence/absence of input data from each set. If the input data is present, the processor unit 14 sets a flag representing the presence of data, and stores the input data in the buffer memory. Although omitted in FIG. 1, the main unit 1 of this embodiment has a function of connecting DSS (Direct Station Selection) and a two-wire telephone set in addition to the above-described set, and the processor unit 14 executes the same processing with respect to input data therefrom and from an office line (steps 202 to 204). If data output is required for the DSS and the two-wire telephone set, the processor unit 14 outputs the required data stored in the buffer (steps 205 to 207).

Therefore, in the main processing of FIG. 3, if a flag representing a data input from the set or the DSS is set (step 107), the processor unit 14 checks whether the input is supplied from an operating data setting port, i.e., the input is supplied from a port connected to the connector $CN_0$ in this embodiment (step 108). If YES in step 108, the processor unit 14 executes operating data processing I as shown in FIG. 5 (step 109).

If the input is not supplied from the operating data setting port but from a normal speech port, the processor 14 executes processing in accordance with the contents of data (step 110). Similarly, when an input is supplied from the two-wire telephone set (step 111), the processor 14 executes processing corresponding to this input (step 112), and when an input is supplied from the office line (step 113), the processor unit 14 executes processing corresponding to this input (step 114). For example, if an off-hook operation is performed in either of the sets, the operation data is received by the processor unit 14. A key operaion in the keyboard 46 is similarly performed. That is, in accordance with an operation of an office line key or an extension key and an operation of the dialing keys, the processor unit 14 controls the speech path switch 12 to perform selective connection. In the case of office line dialing, the processor unit 14 controls the selected office line interface 11 to perform dialing. In the case of extension dialing, the processor unit 14 causes a called party's set to generate an extension ringing tone, and if the called party responds, the processor unit 14 sets a communication state.

Figure 6:
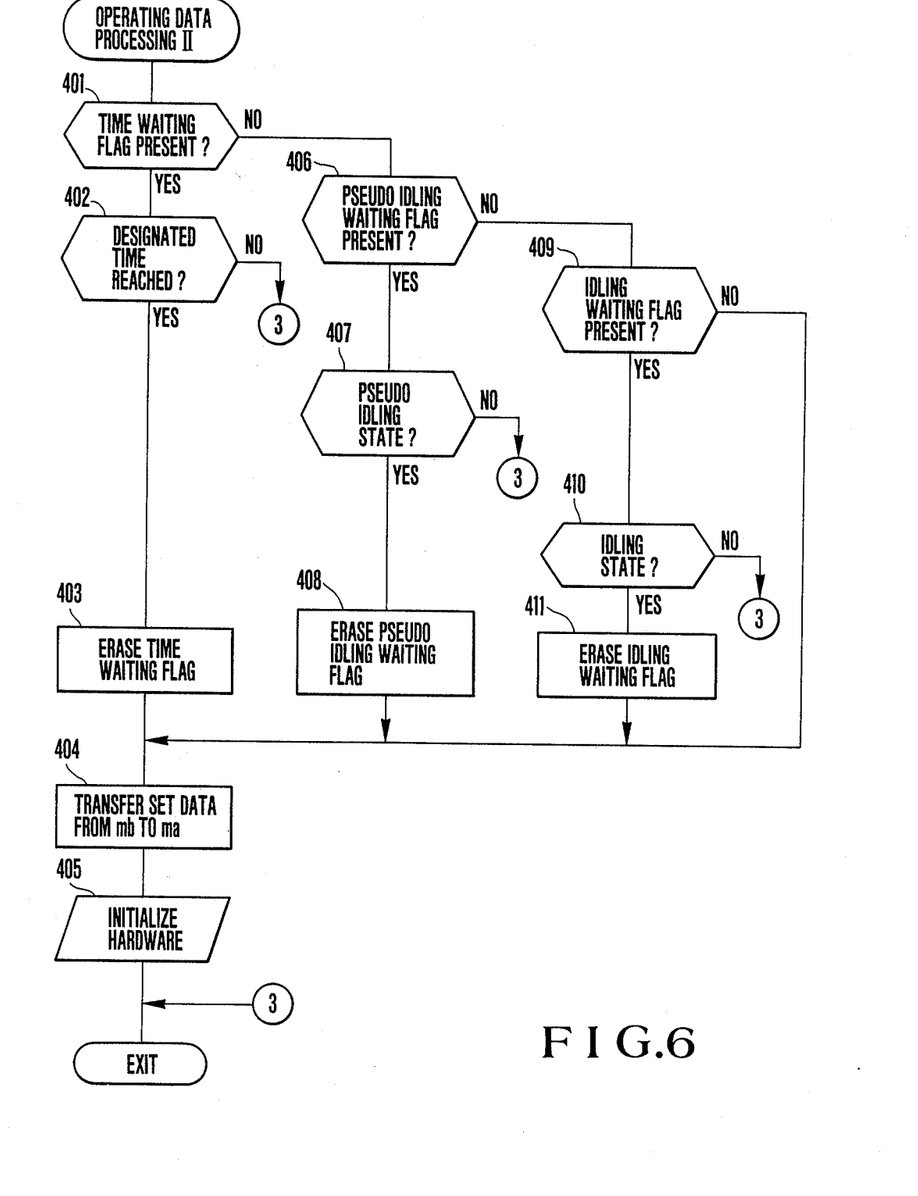

An incoming call from the office lines $2_1$ to $2_n$ is detected by the office line interfaces $11_1$ to $11_n$, and in accordance thereto, the processor unit 14 causes each set to generate an office line incoming ringing tone. If either of the sets responds by an off-hook operation, the processor unit 14 controls the speech path switch 12 and the switch 12 is closed. If these inputs are not supplied, execution of the program transits to an operating data processing II as shown in FIG. 6 (step 115).

Note that the RAM 16 is backed up when a power failure occurs. However, if the power failure continues during the operating mode setting temporary registration operation, the operating data in the temporary registration memory mb may be disorganized as a whole since old and new data are mixed therein. For this reason, when the power failure is recovered, all the data are transferred from the final registering memory ma to the temporary registration memory mb (step 116). The other memories including the memories related to the temporary memory mc and the final registration modes except for the abbreviated dialing memory are cleared.

Figure 5A:
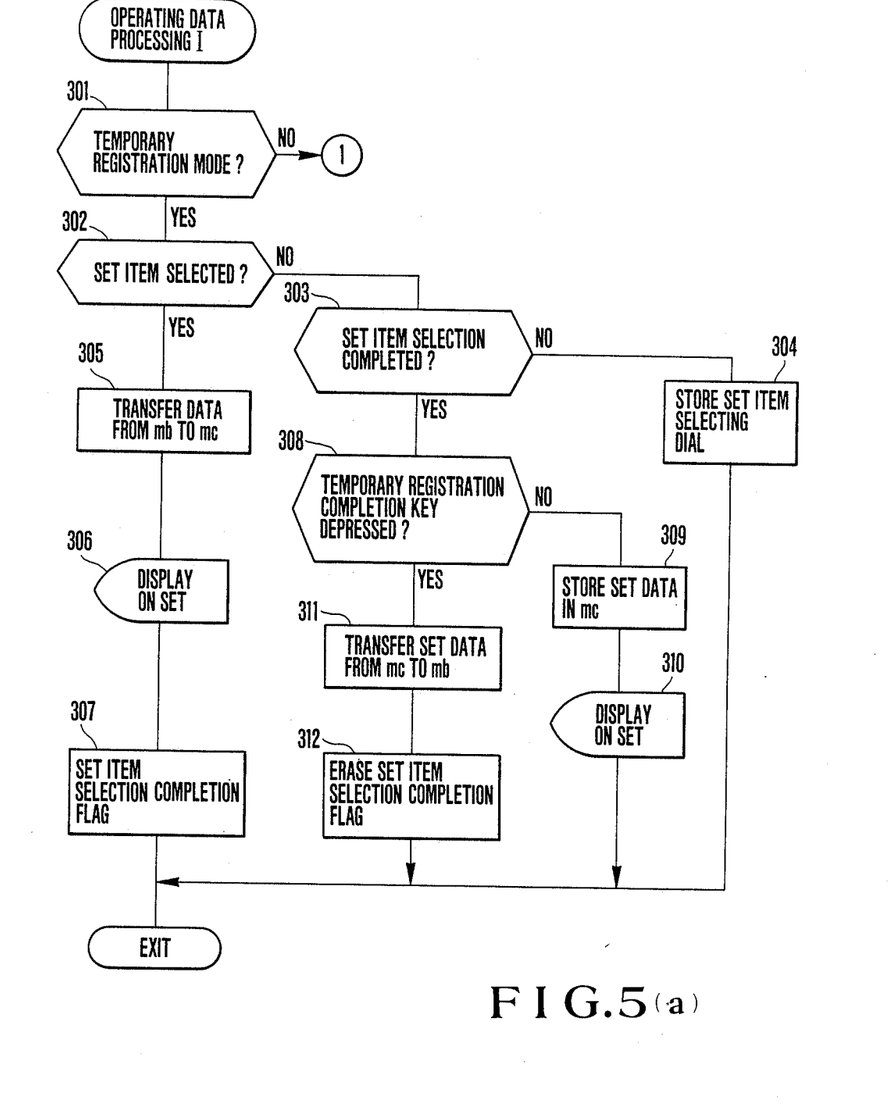
Figure 5B:
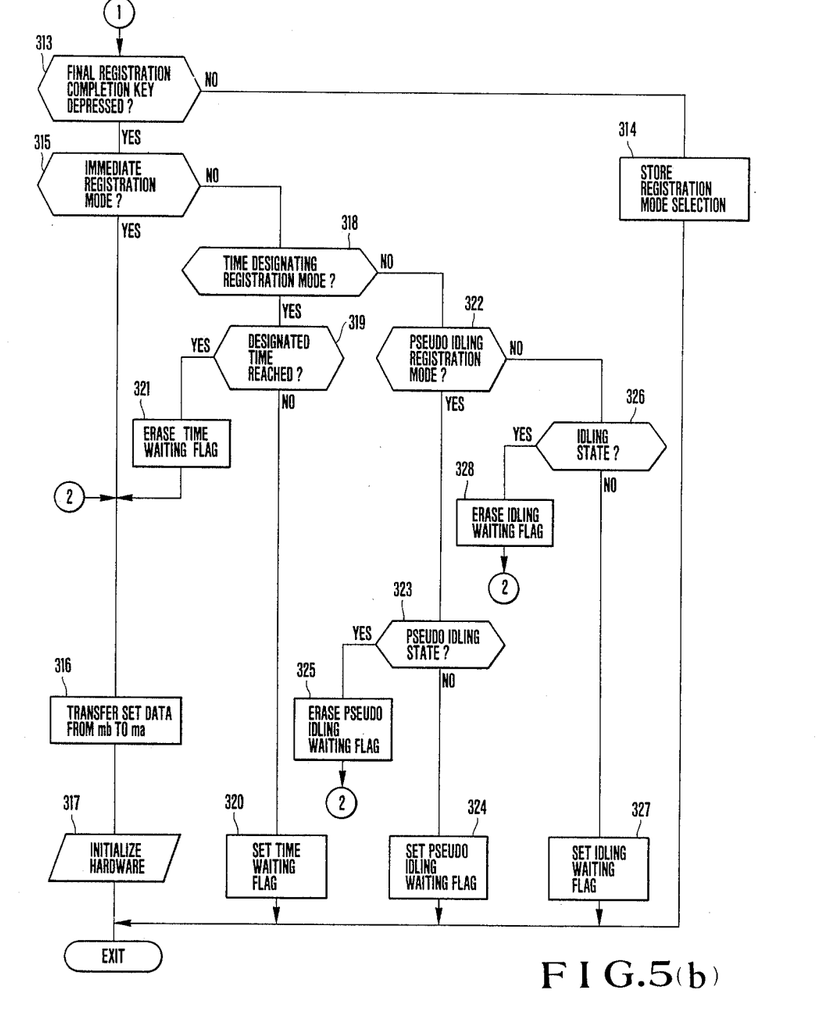

The operating data processing I will be described below. In FIGS. 5(a) and 5(b), if the temporary registration mode is set by depressing "#", "*", "0", and "0" keys after an off-hook operation (step 301), dialing numbers for selecting a set item are sequentially stored (step 304) until selection of the set item is completed (step 301). When the set item is selected by a dialing input of the corresponding numbers (step 302), data corresponding to the selected item is transferred from the temporary registration memory mb to the temporary memory mc (step 305) and displayed on the display 47 (step 306). Thereafter, a flag representing completion of set item selection is set in a predetermined area in the RAM 16 (step 307).

When completion of set item selection is confirmed by the flag (step 303), set data input by a key operation is stored in the temporary memory mc (step 309) and displayed (step 310) until the hold key HLD representing completion of temporary registration is depressed (step 308). When the hold key HLD is depressed (step 308), the contents in the temporary memory mc are transferred to the area of the corresponding item in the temporary registration memory mb (step 311), and the flag representing completion of set item selection is erased (step 312).

If the temporary registration mode is not set (step 301), a key input for selecting the registration mode is stored (step 314) until the key spkr representing completion of final registration is depressed (step 313). When the key spkr is depressed (step 313) and the immediate selection mode is selected, the operating data stored in the temporary registration memory mb is immediately transferred to the operating data memory ma (step 316). Thereafter, each section is set in a state corresponding to the operating data (step 317).

On the contrary, if the time designating registration mode is selected (step 318), a time waiting flag is set (step 320) when the designated time has not been reached (step 319). When the designated time has reached (step 319), the time waiting flag is erased (step 321) and then the flow advances to step 316.

In addition, if the pseudo idling registration mode is selected (step 322), a pseudo idling waiting flag is set (step 324) when the system is not set in the pseudo idling state (step 323), and when the system is set in the pseudo idling state (step 323), the above flag is erased and then the flow advances to step 316.

If neither of the above modes are set, i.e., the idling registration mode is set, an idling waiting flag is set (step 327) when the system is not set in the idling state (step 326), and when the system is set in the idling state (step 326), the above flag is erased (step 326) and then the flow advances to step 316.

In operating data processing II shown in FIG. 6, the presence/absence of the time waiting flag is checked (step 101). If the time waiting flag is set, this flag is erased as in the operating data processing I (step 103) when the designated time has reached (step 102), and then the operating data in the temporary memory mb are simultaneously transferred to the operating data memory ma (step 404). Thereafter, each section is set in a state corresponding to new operating data (step 405).

Similarly, if the pseudo idling waiting flag is set (step 406), this flag is reset (step 408) when the system is set in the pseudo idling state (step 407), and the flow advances to step 404.

If the idling waiting flag is set (step 409), this flag is reset (step 411) when the system is set in the idling state (step 410), and the flow advances to step 404.

Note that if the final registration mode ⑤ (combination registration No. 1) is selected, condition waiting flags of both the final registration mode ② or ③ (in this embodiment, the mode ②) and the final registration mode ④, i.e., the idling waiting flag and the time waiting flag are set when the mode is set. When the condition corresponding to one of the flags is established, final registration is performed, and both the flags are reset.

If the final registration mode ⑥ (combination registration No. 2) is selected, the time waiting flag is set when the mode is set, and an idling waiting transition flag is set. Then, the presence/absence of the idling waiting transition flag is checked when the designated time has reached. If the flag is set, both the flags are reset and the idling waiting flag is set, and then the flow transits to the idling waiting mode.

In the above embodiment, setting operations of the operating mode setting temporary registration and the final registration mode are independently performed. However, these modes may always be performed by a series of setting operations.

In addition, the setting operation is performed using a set connected to a special connector for setting data. However, data may be set using a set at a specific housing position, e.g., the set connected to the connector $CN_1$ at the installation position "1", i.e., the speech port may also be used for setting. In this case, a specific combination key input is performed, and then the operation transits to the setting mode.

Similarly, data may be input by a special input unit or a key input unit incorporated in the main unit without using the set.

Furthermore, the set may be connected to a DSS connecting port, and data may be input therefrom.

Figure 7:
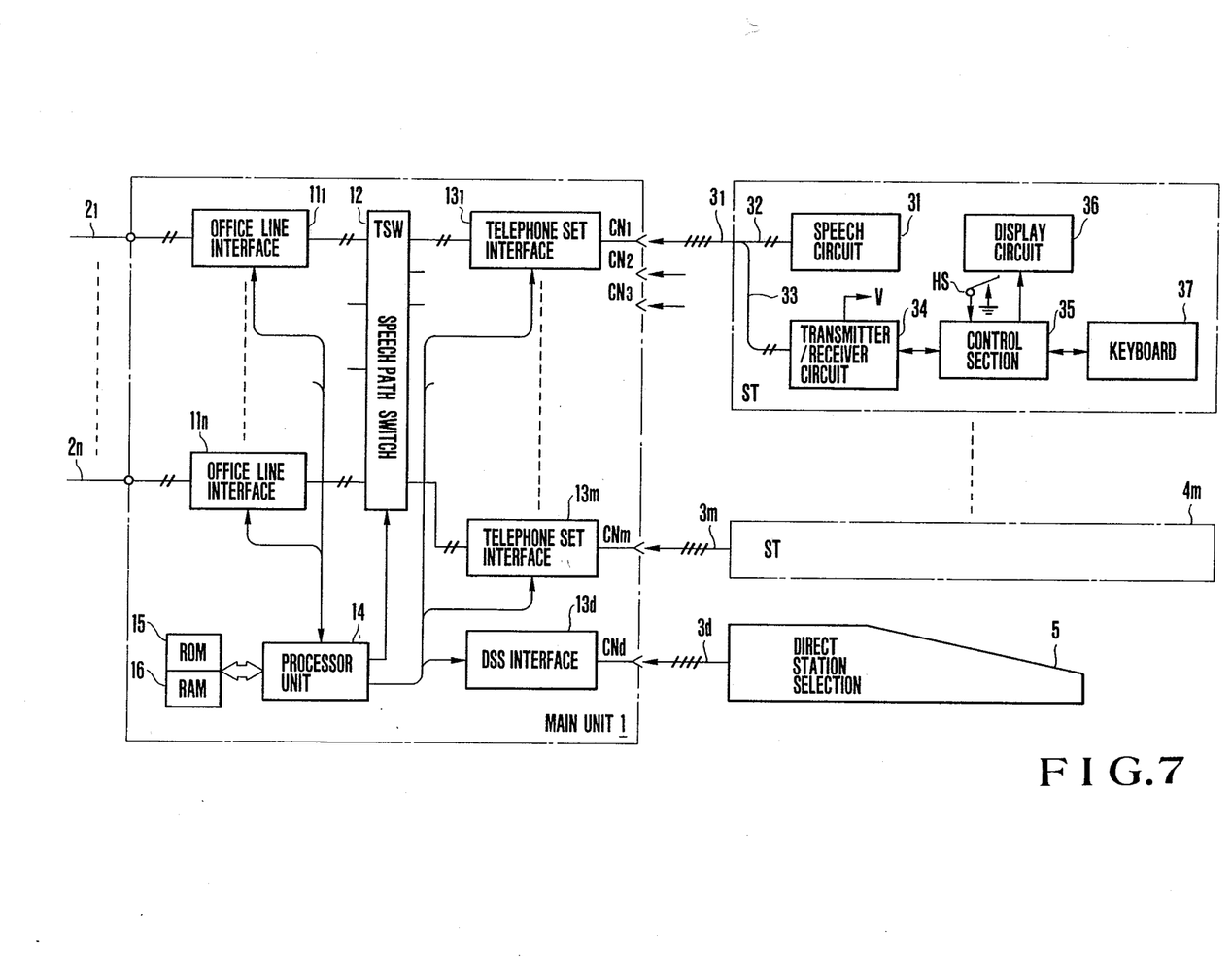
FIG. 7 is a block diagram of another embodiment of the present invention.

FIG. 7 shows another embodiment using a DSS, in which the same parts as in FIG. 1 denote the same reference numerals therein.

A DSS 5 includes self-illuminated switches corresponding to STs 4₁ to 4$_m$ and similar switches for a party call, a group call, and a simultaneous call, and also includes circuits similar to a transmitter/receiver circuit 34 and a control section 35. The DSS 5 transmits operation data of each switch and receives control data, and turns on, turns off, or flickers a display lamp of each switch in accordance with the control data. In this case, an assistant operator uses, e.g., the ST 4$_m$ as an additional telephone set and performs transfer after holding of an office line incoming call or the group call as needed.

Data transfer between a main unit 1 and the STs 4₁ to 4$_m$ together with the DSS 5 is mainly conducted by the main unit 1. For example, data transfer is sequentially and repeatedly performed at a cycle of 40 ms such that operation data is transmitted as a response signal in accordance with the transmission of control data. When an operation is not performed, operation data representing nonoperation is transmitted.

Note that the operation data consists of, e.g., 8 bits. The operation data from each of the STs 4₁ to 4$_m$ represents a state of a hook switch HS by the most significant bit, and each key is operated by lower bits. In this case, the most significant bit is logic "1" in an on-hook state while that from the DDS 5 is logic "0" since data of the hook switch HS is not present. In a nonoperation state, 8-bit operation data from each of the STs 4₁ to 4$_m$ represents "10" in the hexadecimal notation, and that from the DDS 5 represents "1F" in the same notation. Therefore, specific data of the STs 4₁ to 4$_m$ can be determined, and in accordance with interruption of reception of the operation data, the processor unit 14 determines a transmission abnormality with respect to the corresponding line.

Therefore, when operating data is to be registered in an operating data memory provided in a specific area of the RAM 16, the DSS 5 is disconnected from the connector CN$_d$ and connected to either of the STs 4₁ to 4$_m$. In this case, if data transfer interruption of, e.g., 0.5 s or more occurs during registration and is determined as transfer abnormality by the processor unit 14, the first normal operation data is detected as a specific one of the STs 4₁ to 4$_m$ since signal lines of the STs 4₁ to 4$_m$ and the DSS 5 are connected in the same manner with respect to the connector CN$_d$ and data transfer with respect to the STs 4₁ to 4$_m$ becomes normal. Therefore, if the processor unit 14 sets the registration mode in accordance with the above operation data, the operating data can be arbitrarily registered from either of the STs 4₁ to 4$_m$ connected to the connector CN$_d$. When the DSS 5 is connected to the connector CN$_d$ again after the registration operation is completed, the registration mode is released, and accidental setting of the registration mode and updating of the operating mode can be completely prevented.

Note that after the operating mode is registered, the processor unit 14 refers to the operating data memory in the RAM 16 and executes control corresponding to the contents thereof.

As has been described above, according to the present invention, the temporary registration memory and the final registering mode memory are provided, and operating data is finally registered when conditions designated in accordance with final registration mode data stored in the final registering mode memory is established. As a result, the operating data can be updated by extremely simple control processing in accordance with characteristics of the operating data to be rewritten, a capacity of the system, and an operating state thereof.

What is claimed is:

1. A key telephone system including a main unit having a speech path switch for selectively connecting at least one office line with a plurality of key telephone sets, an operating data memory for storing operating data required for operating said system, operation mode setting means for setting an operation mode of said system to either a call processing mode or a data setting mode, and control means for updating contents of said operating data memory in accordance with the operating data externally inputted during the data setting mode and for referring to said operating data memory to control said speech path switch during the call processing mode, said key telephone system comprising:

a temporary registration memory for temporarily storing the externally inputted operating data;

a final registration timing data memory for storing final registration timing data including a timing condition for transferring contents of said temporary registration memory to said operating data memory;

writing means for writing the operating data input and the final registration timing data in said temporary registration memory and said final registration timing data memory, respectively, from a data input unit connected to said main unit during the data setting mode;

discriminating means for discriminating establishment of the timing condition designated in accordance with the final registration timing data stored in said final registration timing data memory; and transferring means for transferring the operating data stored in said temporary registration memory to said operating data memory in accordance with a timing condition establishment output from said discriminating means.

2. A system according to claim 1, wherein the timing conditions specified by the final registration timing data comprise immediate registration, system idling registration, and set time registration.

3. A system according to claim 2, wherein the timing conditions specified by the final registration timing data further comprise system pseudo idling registration.

4. A system according to claim 1, wherein the final registration timing data is data for instructing final registration in accordance with a condition that is established first in time, the condition being one of system idling, system pseudo idling, and a predetermined set time.

5. A system according to claim 1, wherein the final registration timing data is data for instructing system idling registration or system pseudo idling registration after a predetermined set time has been reached.

6. A system according to claim 1, wherein said discriminating means comprises means for allowing transfer of operating data to said operating data memory during all office line idling or when a number of combinations of the characteristics and the number of calls is reduced below a value represented by a predetermined condition in accordance with the system pseudo idling registration mode data stored in said final registration timing data memory.

7. A system according to claim 1, wherein said writing means comprises means for storing the operating data and the final registration timing data in said temporary registration memory and said final registration timing data memory respectively by independent input operations.

8. A system according to claim 1, wherein said data input unit comprises a plurality of keys for inputting data and display means for displaying items and control parameters of the operating data.

9. A system according to claim 1, wherein said data input unit is one of a plurality of key telephone sets, and the operating data is input using a plurality of keys of each of said key telephone sets.

10. A system according to claim 9, wherein said one key telephone set for inputting the operating data is a predetermined key telephone set.

11. A system according to claim 1, wherein said main unit comprises a plurality of call processing interfaces for connecting said plurality of telephone sets with each other to perform call processing and at least one operating data setting interface, and said control means registers the operating data in accordance with data input from said data input unit through said operating data setting interface.

12. A system according to claim 1, wherein said main unit comprises a plurality of call processing interfaces for connecting said plurality of key telephone sets with each other to perform call processing, a DSS interface for connecting at least one DSS console, and determining means for determining which one of said DSS console and said data input unit is connected to said DSS interface, and said control means registers the operating data in accordance with data inputted from said data input unit through said DSS interface on the basis of an output from said determining means when said data input unit is connected.

13. A key telephone system including a main unit having speech path switch for selectively connecting at least one office line with a plurality of key telephone sets, an operating data memory for storing operating data required for operating said system, operation mode setting means for setting an operation mode of said system to either a call processing mode or a data setting mode, and control means for updating contents of said operating data memory in accordance with the operating data externally inputted during the data setting mode and for referring to said operating data memory to control said speech path switch during the call processing mode, said key telephone system comprising:

a temporary memory for storing an item of externally inputted operating data;
a temporary registration memory for temporarily storing the same operating data as that stored in said operating data memory; and
detecting means for detecting temporary registration request data and final registration request data from a data input unit for inputting the operating data,
wherein said control means transfers and registers said item of operating data stored in said temporary memory to said temporary registration memory in accordance with a temporary registration request data detection output from said detecting means, and transfers and registers contents of said temporary registration memory to said operating data memory in accordance with a final registration requet data detection output from said detecting means.

14. A system according to claim 13, further comprising display monitor data outputting means, and wherein said control means transfers and stores a designated item of operating data from said temporary registration memory to said temporary memory in accordance with an input of operating data item designating information, rewrites the transferred and stored operating data in accordance with the externally inputted operating data, and outputs said designated item of operating data of said temporary memory to said data input unit by said display monitor outputting means.

15. A system according to claim 1, wherein said operation mode setting means switches an operation mode in accordance with predetermined code data from said data input unit.

16. A system according to claim 1, wherein said final registration timing data is a plurality of data, and the operating data is finally registered at a final registration timing from the final registration timing data stored in said final registration timing data memory selected by a user.

17. A system according to claim 1, wherein said temporary registration memory comprises a memory area for storing the same operating data as that stored in said operating data memory.

18. A system according to claim 1, wherein said control means stores the same data as the contents of said operating data memory in said temporary registration memory when a power failure is recovered and a power switch is turned on.

* * * * *

UNITED STATES PATENT AND TRADEMARK OFFICE
CERTIFICATE OF CORRECTION

PATENT NO. : 4,821,316
DATED : 04/11/89
INVENTOR(S) : Okumura et. al.

It is certified that error in the above-identified patent and that said Letters Patent is hereby corrected as shown below:

col. 01, line 14 after "detected" delete "to" insert --so-- col. 05, line 51 delete "befodre" insert --before-- col. 06, line 14 delete "srtep" insert --step-- col. 06, line 64 delete "operaion" insert --operation--

Signed and Sealed this

Thirteenth Day of November, 1990

*Attest:*

HARRY F. MANBECK, JR.

*Attesting Officer*      *Commissioner of Patents and Trademarks*